Nov. 26, 1963   R. O. FREDETTE   3,111,843
HYPERSONIC WIND TUNNEL
Filed Aug. 1, 1960   3 Sheets-Sheet 1

INVENTOR.
Raymond O. Fredette
BY
Dome, McDougall,
Williams & Hersh
Attorneys

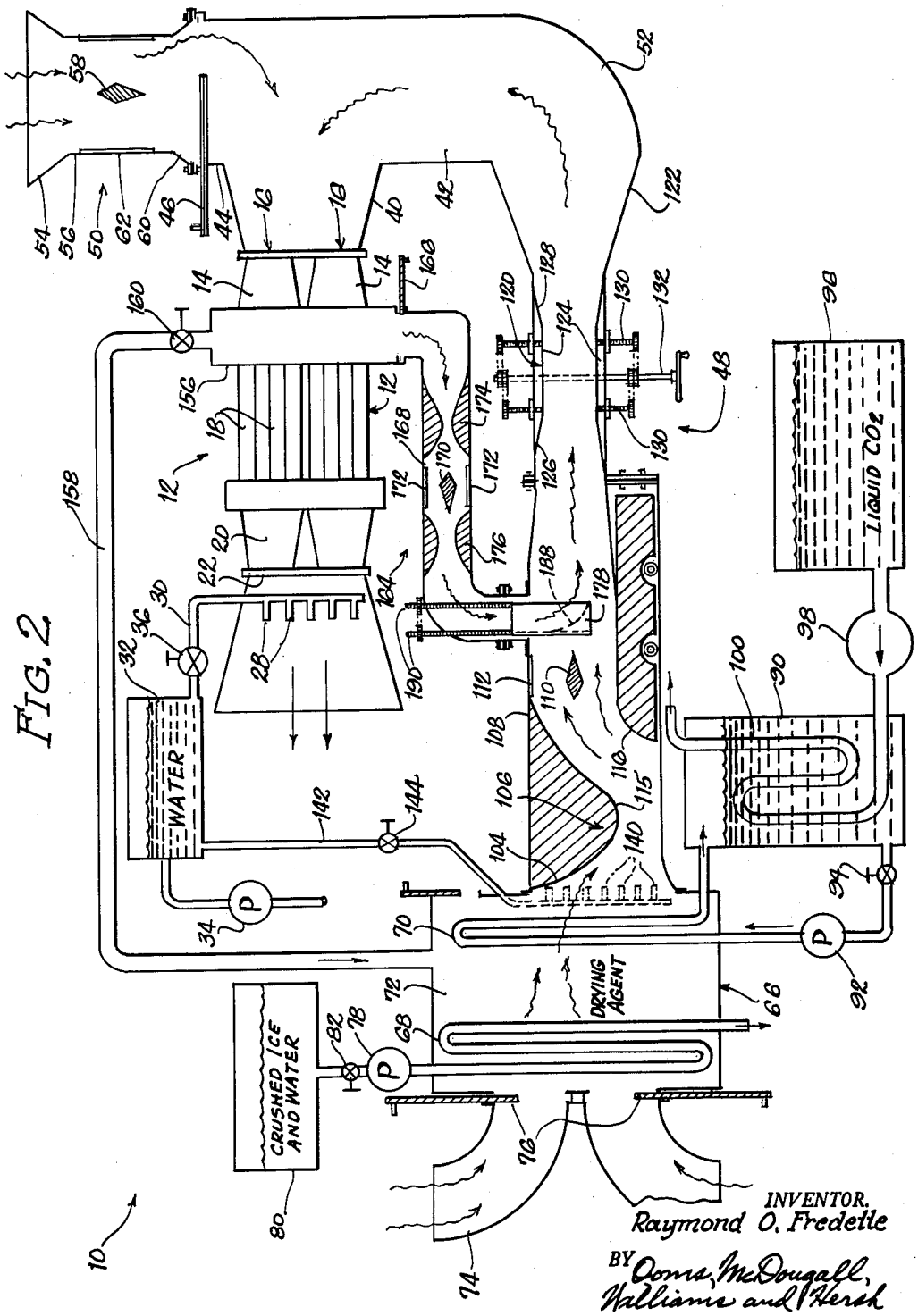

Nov. 26, 1963  R. O. FREDETTE  3,111,843
HYPERSONIC WIND TUNNEL
Filed Aug. 1, 1960  3 Sheets-Sheet 3

INVENTOR.
Raymond O. Fredette
BY Ooms, McDougall,
Williams and Hersh
Attorneys

United States Patent Office 3,111,843
Patented Nov. 26, 1963

3,111,843
HYPERSONIC WIND TUNNEL
Raymond O. Fredette, Mount Prospect, Ill., assignor to Cook Electric Company, Chicago, Ill., a corporation of Delaware
Filed Aug. 1, 1960, Ser. No. 46,565
6 Claims. (Cl. 73—147)

This invention relates to a new and improved wind tunnel for making aerodynamic tests.

One object of the present invention is to provide a new and improved wind tunnel which is extremely versatile, in that it is capable of making aerodynamic tests at subsonic, transonic, supersonic and hypersonic velocities.

Another object is to provide a wind tunnel which is arranged in a new and improved manner so as to utilize one or more turbojet engines for moving air through the wind tunnel at velocities ranging up to the hypersonic.

A further object is to provide a new and improved wind tunnel of the foregoing character which is equipped with beds of desiccant material for drying the air as it is drawn into the wind tunnel, and which is arranged so that the desiccant material may be dried out, after use, with hot compressed air from the jet engines.

It is another object to provide a new and improved wind tunnel which may be put into operation quickly and which is economical to construct and operate.

A further object is to provide a new and improved wind tunnel having a hypersonic circuit which is connected between the compressed air outlets of the jet engines and a point in one of the other wind tunnel circuits which is maintained at a subatmospheric pressure by the intake suction of the engines.

Further objects and advantages of the present invention will appear from the following description, taken with the accompanying drawings, in which:

FIG. 2 is a diagrammatic sectional view showing the layout of the wind tunnel.

Figure 1:
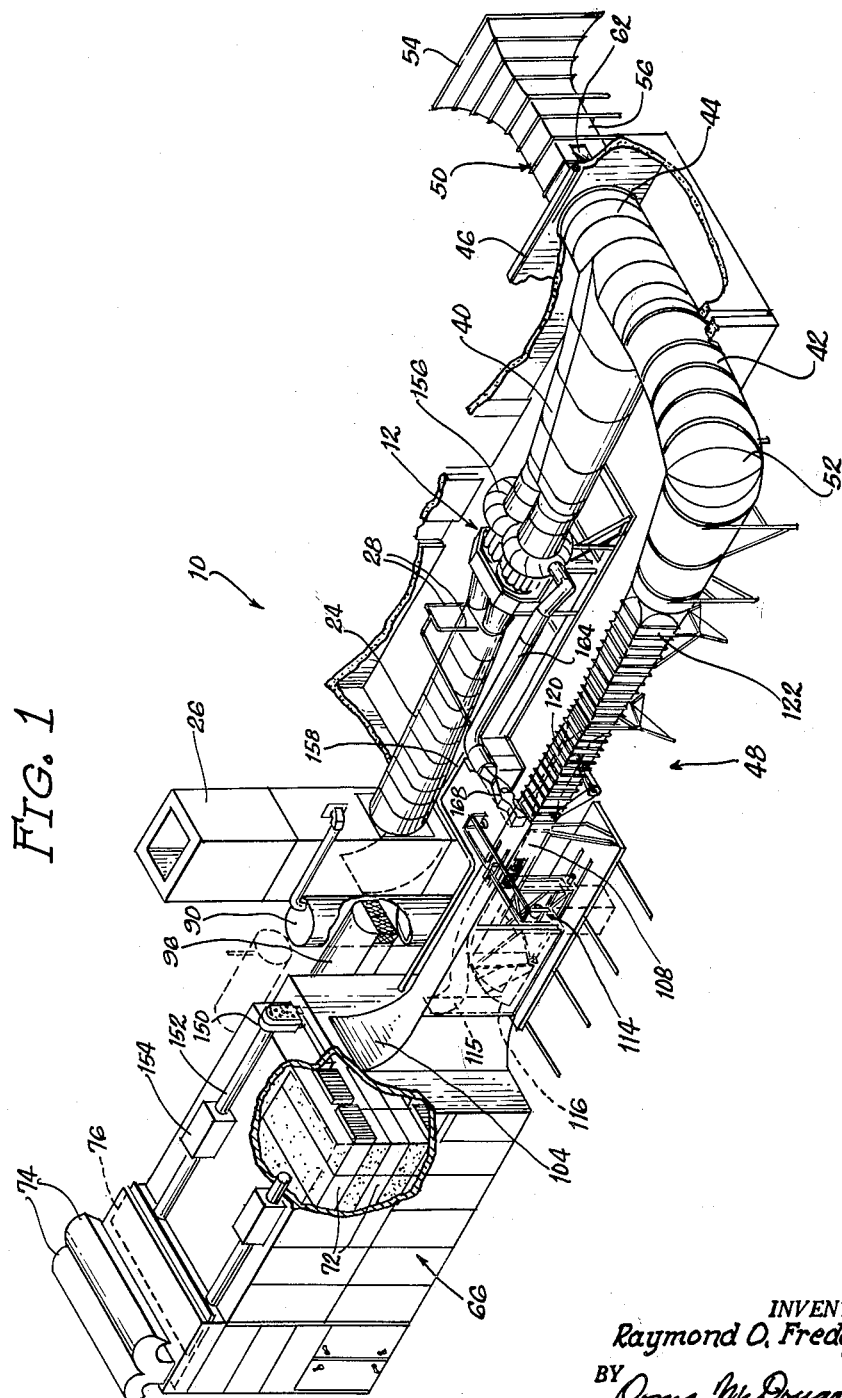
FIG. 1 is a general perspective view showing a wind tunnel to be described as an illustrative embodiment of the present invention, certain parts being broken away for clarity of illustration.

As already indicated, FIGS. 1 and 2 illustrate a wind tunnel 10 which is highly economical, yet is capable of making aerodynamic tests at hypersonic and supersonic velocities. For example, the wind tunnel is also capable of making tests at lower velocities. In this case, an extremely large amount of power for moving air through the wind tunnel is provided at very low cost by means of one or more turbo-jet engines 12 of the type commonly used on jet aircraft. In this case, two jet engines are employed, but the number may be varied according to the power that is required. Each jet engine 12 has a compressor turbine 14 which draws in air through an intake opening 16. The compressed air passes into a combustion section 18 where fuel is injected and burned. The hot gases from the combustion section 18 pass through a power turbine 20 and are discharged from a discharge opening 22. It has been found that suitable jet engines are generally available as military surplus items at extremely low cost. In this case, the turbo-jet engines 12 are employed to draw a large amount of air from the atmosphere and through the wind tunnel at high speed.

The exhaust gases from the jet engines 12 may be discharged into a duct 24. As shown in FIG. 1, the exhaust duct 24 is connected to a vertical stack 26 which discharges the exhaust gases upwardly into the atmosphere. The stack 26 effectively dissipates and reduces the noise produced by the jet engines 12. In order to cool the exhaust gases, water may be sprayed into the exhaust pipe 24 through water nozzles 28. A pipe 30 may be connected between the nozzles 28 and a tank 32, representing a source of water under pressure. Water may be supplied to the tank 32 by a pump 34 connected to a suitable source of water. A valve 36 is connected into the pipe 30 to shut off and regulate the flow of water to the nozzles 28.

It will be seen that a branching duct 40 is connected to the intake openings 16 of the jet engines 12. As shown, the duct 40 has two branches 42 and 44. Air may be drawn into either or both of the branches 42 and 44. A gate 46 is provided to regulate or shut off the flow of air into the branch 44. The gate 46 may be closed so that all of the air will be drawn into the jet engines 12 through the branch 42.

A primary supersonic testing duct or circuit 48 may be connected to the branch 42, while a second subsonic testing duct or circuit 50 is connected to the branch 44. To provide a compact arrangement, the primary testing duct 48 is preferably parallel to the axes of the jet engines 12. Thus, the branch 42 extends at right angles to the axes of the jet engines, and the primary testing duct 48 is connected to the branch by an elbow 52. However, the tunnel ducts 48 and 50 may extend in any suitable or desired directions from the jet engines.

As shown, the secondary testing duct 50 has a flaring entrance portion 54 which communicates directly with the atmosphere. The entrance portion 54 is connected to a constricted test section 56 of reduced cross section, in which a model 58 may be mounted for aerodynamic tests. A flaring diffuser section 60 is connected between the test section 56 and the branch pipe 44. The test section 56 is employed primarily for subsonic tests on relatively large models. The jet engines 12 are capable of moving a large volume of air at subsonic speeds through the secondary testing duct 50. The use of the duct 50 for aerodynamic tests has the advantage that the model 58 may be observed through the open entrance portion 54 of the duct 50. Of course, windows 62 may also be provided in the test section 56 for observing the model 58. When the secondary duct 50 is in use, the gate 46 is opened. The primary testing duct 48 may be closed off, in a manner to be described shortly. When tests are to be run in the primary duct 48, the gate 46 is normally closed. For certain tests, the gate 46 may be partially opened so as to bleed air into the intake openings 16 of the jet engines 12. In this way, an adequate supply of air may be provided to insure the proper operation of the jet engines.

The primary testing duct 48 is preferably provided with facilities for cooling and drying the air which is drawn into the duct from the atmosphere. Thus, the primary duct 48 has an enlarged entrance housing 66 which contains cooling coils 68 and 70 and drying facilities 72. In this case, atmospheric air enters the top of the housing 66 through gooseneck hoods 74 which exclude rain. The hoods are shown to best advantage in FIG. 1. A gate 76 is provided for partially or completely closing the entrance to the housing 66.

As shown to advantage in FIG. 1, the drying facilities 72 may take the form of beds of a drying agent, such as activated alumina, for example, adapted to extract moisture from the air. The cooling coils 68 and 70 may be arranged to provide two stages of cooling. Thus, a mixture of crushed ice and water may be circulated through the cooling coils 68 by a pump 78, which may receive the mixture from a tank 80. A valve 82 may be provided to regulate the flow of the ice and water mixture through the cooling coils 68. As shown, the air passes over the coils 68 before passing through the drying facilities 72.

In order that the air may be cooled to an extremely low temperature, the second cooling coils 70 may be supplied with a liquid refrigerant which has been cooled by liquid carbon dioxide or the like. As shown, the refrigerant is stored in a tank 90 and may be circulated through the coils 70 by a pump 92. A valve 94 may be employed to regulate the circulation of the refrigerant. A supply of liquid carbon dioxide may be held in a tank 96. As shown, the carbon dioxide passes through an expansion valve 98 and then through coils 100 which are in contact with the liquid refrigerant in the tank 90. After cooling the refrigerant, the carbon dioxide may be allowed to escape into the atmosphere. The refrigerant which is circulated through the coils 70 may taken the form of a liquid having a low freezing point, such as trichloroethylene, for example.

The primary testing duct 48 has a flaring entrance portion 104 which receives the air from the housing 66. The air then passes through a constricted nozzle 106. The constriction of the nozzle with subsequent expansion causes the velocity of the air to increase greatly, so that supersonic velocities may be achieved. The air then passes through a test section 108 in which a model 110 may be mounted for aerodynamic tests. One or more windows 112 may be provided in the test section 108 so that model may be observed and photographed. A shadowgraph optical system or an optical system of the Schlieren type may be employed for observing shock wave patterns around the model 110. Thus, the Schlieren optical system is represented at 114 in FIG. 1. Additional instrumentation of any desired type may be employed in connection with the model 110.

The illustrated nozzle 106 is of the asymmetrical adjustable type, having a fixed block 115 and an adjustable block 116. The fixed block 115 projects into the duct 48 so as to produce a constriction. The degree of the constriction may be adjusted by moving the adjustable block 116 longitudinally along the duct 48, toward and away from the fixed block 114. Any other type of fixed or adjustable nozzle may be employed in the duct 48.

After passing through the test section 108, the air passes through an adjustable diffuser nozzle 120 and a fixed flaring diffuser section 122 which communicates with the elbow 52. As shown, the adjustable diffuser nozzle 120 comprises a pair of plates 124 which are parallel to the air stream and are movable toward and away from each other so as to vary the degree of constriction afforded by the nozzle. Pairs of plates 126 and 128 extend obliquely between the ends of the adjustable plates 124 and the walls of the duct 48 so as to provide smoothly flaring entrance and exit portions of the nozzle 120. The nozzle plates 124 may be adjusted by a system of screws 130 which may be rotated simultaneously by means of a shaft 132.

Figure 3:
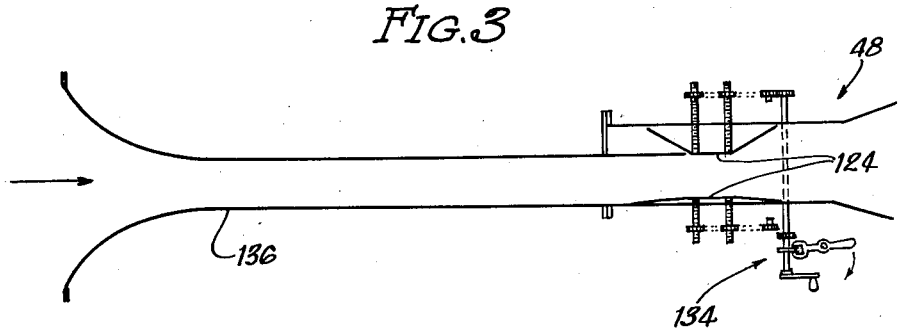
FIG. 3 is a fragmentary diagrammatic view, corresponding to a portion of FIG. 2, but showing a modification.

As shown in FIG. 3, a gear-shifting mechanism 134 may be provided so that each of the plates 124 may be moved independently of the other plate, if desired. In this way, the diffusing nozzle 120 may be rendered asymmetrical, as represented in FIG. 3. This view illustrates a modified construction in which the adjustable nozzle 106 is replaced by a fixed nozzle 136. One of the plates 124 is moved close to the wall of the duct 48, while the other plate 124 is moved away from the opposite wall, so that the plates will line up with the walls of the nozzle 136. This arrangement reduces the losses in the system.

For efficient supersonic operation with the adjustable nozzle 106 of FIG. 2, the diffuser nozzle 124 may be adjusted so as to reduce the losses in the system and thereby increase the Mach number that is obtainable in the test section 108 of the wind tunnel.

When an extremely small nozzle section is employed in the primary duct 48, it may be necessary or desirable to bleed additional air into the jet engines 12 by partially opening the gate 46 in the secondary branch 44. In this way, sufficient air is supplied to the jet engines to maintain them in operation.

For use in making icing tests, spray nozzles 140 are provided for introducing water droplets into the entrance 104 of the primary testing duct 48. For such icing tests, the air is generally cooled to a low temperature by the use of the cooling coils 68 and 70. The combination of the low air temperature and introduction of water through the nozzles 140 subject the model 110 to icing conditions. The water may be delivered under pressure to the nozzles 140 from the tank 32 by a pipe 142 with a regulating valve 144 connected therein.

During use, the drying agent in the drying beds 72 absorbs moisture from the air. Eventually the drying agent absorbs moisture to such an extent that it loses its ability to extract moisture from the air. The drying agent may be dried out, and thereby regenerated, by circulating heated air through the housing 66. For this purpose, one or more fans 150 may be provided to force air through ducts 152 which lead into the housing. Heaters 154 may be connected into the ducts 152 to heat the air. Two such systems are provided in the illustrated construction.

An alternative arrangement for drying out the desiccant material in the drying beds 72 is shown to advantage in FIG. 2. It will be seen that a ring shaped manifold pipe 156 is connected to the output of the compressor turbines 14 of the jet engines 12. The connections between the compressors and the pipe 156 may be made through the compressed air bleed ports which are normally provided in jet engines to supply compressed air to accessory devices, such as heaters and de-icing equipment, commonly used on aircraft. The compression of the air by the compressor turbines 14 raises the temperature of the air so that it is quite hot at the output of the compressors. In the illustrated arrangement, a pipe 158 is connected between the manifold 156 and the intake housing 66 so as to carry the hot compressed air to the desiccant beds 72 in the housing 66. A valve 160 may be connected into the pipe 158 for controlling and shutting off the flow of hot air. It will be apparent that the hot air passes through the desiccant beds 72 and heats up the inside of the intake housing 66. The desiccant material in the beds 72 will be dried out by the flow of hot air. The hot air may be allowed to escape from the housing 66 through the intake hoods 74, or through any other suitable opening in the housing. While the jet engines 12 are being operated to dry out the desiccant beds 72, the intake air for the engines may be drawn through the secondary testing duct 50. Thus, it is possible to conduct aerodynamic tests in the secondary duct 50 while the jet engines are being used to dry out the desiccant material. The hot air from the jet engines may be used instead of the hot air from the fans 150 and the heaters 154. Alternatively, both the heaters 154 and the jet engines may be employed to achieve particularly quick drying of the desiccant material.

In order to carry out hypersonic tests, at many times the speed of sound, a third testing duct or circuit 164 may be connected between the output of the compressors 14 and a suitable point in the primary testing duct 48. The pressure of the air at the output of the compressors 14 may be quite high. Thus, pressures ranging up to 12 atmospheres are readily achieved. By suitably constricting the nozzle section 106 of the primary testing duct 48, the pressure in the duct 48 may be reduced substantially below atmospheric pressure. Thus, for example, a pressure of one-half atmosphere may be achieved in the duct 48. Thus, the pressure ratio between the ends of the hypersonic testing duct 164 may be as high as 24 to 1. In consequence, air is driven through the hypersonic duct 164 at extremely high speed, many times the speed of sound.

A gate 166 may be provided between the compressor manifold 156 and the entrance of the hypersonic duct 164 for regulating and shutting off the flow of air into the duct. It will be seen that the duct 164 is provided with a test section 168 in which a model 170 may be observed through windows 172 in the test section 168. Any suitable or desired instrumentation may be employed in connection with the model 170.

To increase the velocity of the air in the test section 168, a constricted nozzle 174 is preferably provided in the duct 164 between the entrance and the test section 168. Downstream from the test section 168 a second diffusing nozzle 176 may be provided to reduce the losses in the hypersonic circuit 164.

Figure 4:
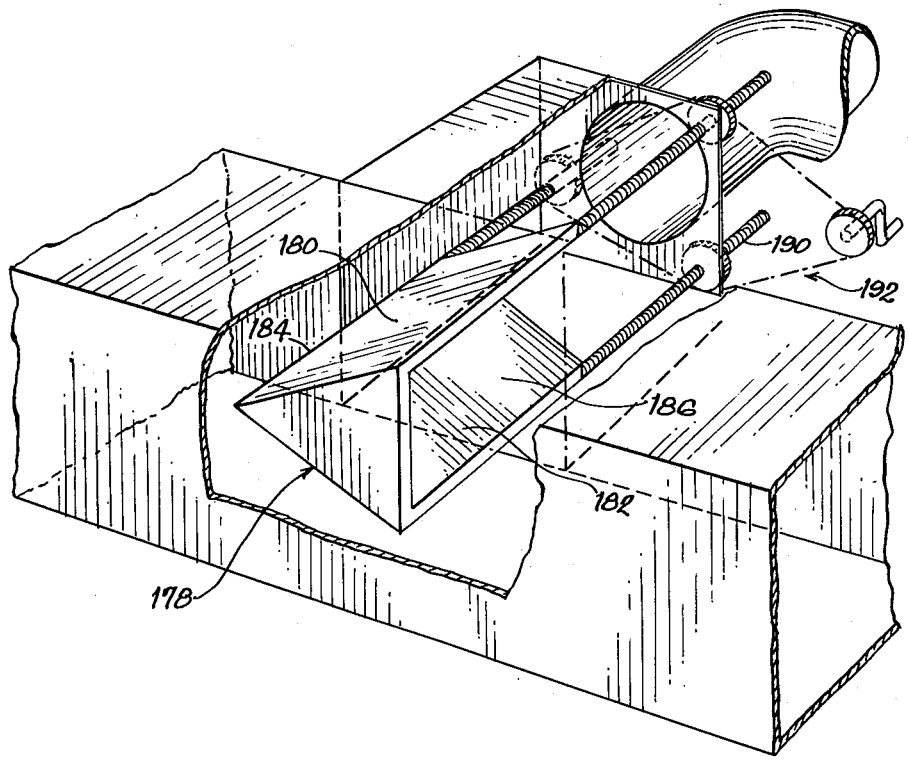
FIG. 4 is a fragmentary perspective view, showing the discharge or ejector section of the hypersonic tunnel circuit.

In this case, the outlet of the hypersonic circuit 164 is connected to the primary duct 48 at a point just downstream from test section 168. An ejector baffle or guide 178 is preferably provided to direct the flow of air from the duct 164 into the duct 48 with a minimum of losses. As shown to best advantage in FIG. 4, the ejector baffle 178 may be in the form of a generally V-shaped trough having upper and lower walls 180 and 182 which converge to a point or edge 184, directed upstream. The trough shaped baffle 178 has an open side 186 which is directed downstream. At its outer end, the baffle 178 may have a curved wall 188 for directing the air downstream from the outlet of the duct 164. When the hypersonic duct 164 is in use, the ejector baffle 178 is extended into the air stream in the duct 48. When the duct 164 is not being used, the ejector baffle 178 is retracted into the discharge end of the duct 164, so that the baffle 178 does not extend into the duct 48. A system of screws 190 may be provided for extending and retracting the baffle 178. A suitable drive 192 may be provided for rotating the screws simultaneously. This arrangement makes it easy to adjust the amount by which the baffle 178 projects into the duct 48, so as to obtain the desired hypersonic air velocity in the duct 164, while minimizing the losses in the duct 48.

The mass flow of air through the hypersonic duct 164 may be in the order of 15% of the total mass flow capabilities of the jet engines. Thus, the hypersonic testing section may be of large size. When conducting hypersonic tests in the duct 164, it generally is desirable to bleed additional air into the intakes of the jet engines through the secondary duct 50, by opening the gate 46 to some extent. In this way, sufficient air will be supplied to the jet engines to maintain them in efficient operation, despite the constriction introduced into the duct 48.

It will be evident that the illustrated wind tunnel is extremely versatile, because it is useable for conducting aerodynamic tests at subsonic, transonic, supersonic and hypersonic velocities. Three different tunnel circuits and test sections are provided, one for subsonic tests, another for supersonic tests, and the third for hypersonic tests. Of course, the supersonic test circuit may also be used at lower velocities by selecting a suitable nozzle arrangement and adjusting the speed of the jet engines. The intake of air to the supersonic circuit may be cooled and dried out to simulate conditions at high altitudes.

Inasmuch as the jet engines may be started quickly, the tunnel may be placed into operation in a very short time. This increases the useable testing time of the tunnel and decreases the cost of operation. Because of the low cost of the jet engines and the other components, the wind tunnel may be constructed at low cost.

Various other modifications, alternative constructions and equivalents may be employed without departing from the true spirit and scope of the invention as exemplified in the foregoing description and defined in the following claims.

I claim:

1. In a wind tunnel, the combination comprising a turbojet engine including a compressor turbine having an entry section for sucking in air, a first tunnel duct connected between the atmosphere and said entry section and having an intake section with a constricted nozzle therein, and an additional tunnel duct connected between the output of said compressor turbine and said first duct at a point thereon disposed between said nozzle and said entry section of said engine, air being propelled through said additional duct by the combination of the pressure from said turbine and the partial vacuum in said first duct, said additional duct having a test section therein for making aerodynamic tests.

2. In a wind tunnel, the combination comprising a turbojet engine having a compressor turbine with an entry section for sucking in air, a first tunnel duct connected between the atmosphere and said entry section, an additional tunnel duct connected between the output of said compressor turbine and said first duct and having a test section therein, air being propelled through said additional duct by the combined action of the pressure from said turbine and the partial vacuum in said first duct, and a baffle extending from said additional duct into said first duct for carrying air in a smooth manner into said first duct from said additional duct and deflecting said air downstream into said first duct toward said entry section of said engine.

3. In a wind tunnel, the combination comprising a turbojet engine having a compressor turbine with an entry section for sucking in air, a first tunnel duct connected between the atmosphere and said entry section, an additional tunnel duct connected between the output of said compressor turbine and said first duct and having a test section therein, air being propelled through said additional duct by the combined action of the pressure from said turbine and the partial vacuum in said first duct, and a generally trough-shaped baffle extending into said first duct from the outlet of said additional duct and having an open side facing downstream toward said entry section of said engine for introducing the air from said additional duct into said first duct in an efficient manner.

4. In a wind tunnel, the combination comprising a turbojet engine having a compressor turbine with an entry section for sucking in air, a first tunnel duct connected between the atmosphere and said entry section, an additional tunnel duct connected between the output of said compressor turbine and said first duct and having a test section therein, air being propelled through said additional duct by the combined action of the pressure from said turbine and the partial vacuum in said first duct, a generally trough-shaped baffle projecting into said first duct from said additional duct and having an open side facing downstream toward said entry section of said engine for introducing the air from said additional duct into said first duct, and means for extending and retracting said baffle into and out of said first duct.

5. In a wind tunnel, the combination comprising a turbojet engine including a compressor turbine having an entry section for sucking in air, a first tunnel duct connected between the atmosphere and said entry section and having an intake section with a constricting nozzle therein, an additional tunnel duct connected between the output of said compressor turbine and said first duct at a point thereon disposed between said nozzle and said entry section of said engine, air being propelled through said additional duct by the combination of pressure from said turbine and the partial vacuum in said first duct, and a baffle extending from said additional duct into said first duct for carrying air in a smooth manner into said first duct from said additional duct and deflecting said air downstream into said first duct toward said entry section of said engine, said additional duct having a test section therein for making aerodynamic tests.

6. In a wind tunnel, the combination comprising a turbojet engine having a compressor turbine with an entry section for sucking in air, a first tunnel duct connected between the atmosphere and said entry section, an additional tunnel duct connected between the output of said compressor turbine and said first duct and having a test section for making aerodynamic tests, air being propelled through said additional duct by the combined action of the pressure from said turbine and the partial vacuum in said first duct, a baffle extending from said additional duct into said first duct for carrying air in a smooth manner into said first duct from said additional duct and deflecting said air downstream into said first duct toward said entry section of said engine, and means for extending and retracting said baffle into and out of said first duct.

References Cited in the file of this patent

UNITED STATES PATENTS

| | | |
|---|---|---|
| 2,592,322 | Nerad | Apr. 8, 1952 |
| 2,667,185 | Beavers | Jan. 26 1954 |
| 2,805,571 | Graham | Sept. 10, 1957 |
| 2,914,941 | Frenzl | Dec. 1, 1959 |

FOREIGN PATENTS

| | | |
|---|---|---|
| 635,609 | Great Britain | Apr. 12, 1950 |
| 1,066,135 | France | Jan. 20, 1954 |